(No Model.)
R. EICHSTAEDT.
DRAWER PULL.
No. 481,853. Patented Aug. 30, 1892.
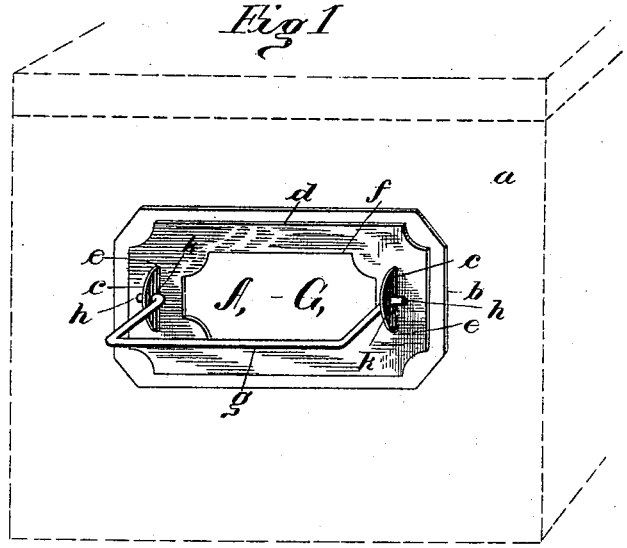
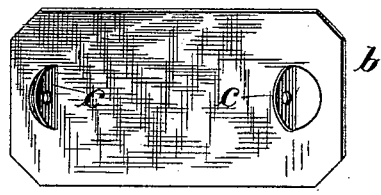
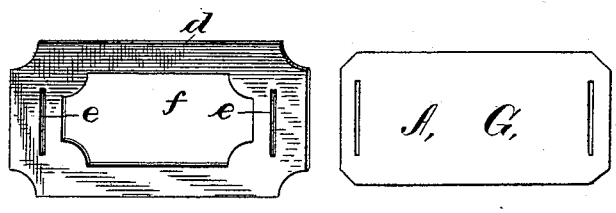
WITNESSES:
INVENTOR
Roman Eichstaedt
BY
ATTORNEYS.

UNITED STATES PATENT OFFICE.

ROMAN EICHSTAEDT, OF MICHIGAN CITY, INDIANA.

DRAWER-PULL.

SPECIFICATION forming part of Letters Patent No. 481,853, dated August 30, 1892.

Application filed April 30, 1892. Serial No. 431,228. (No model.)

*To all whom it may concern:*

Be it known that I, ROMAN EICHSTAEDT, a citizen of the United States, residing at Michigan City, in the county of La Porte and State of Indiana, have invented certain new and useful Improvements in Drawer-Pulls; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that particular class of pulls or handles used on paper boxes and provided with a sight-hole through which may be seen a tag describing the contents of the drawer or box.

The object of my invention is to produce a device which will be more simple, cheap, and easily applied than those heretofore in use.

To this end my invention consists in the peculiar features and combinations of parts more fully described hereinafter, and pointed out in the claim.

In the accompanying drawings, Figure 1 represents a perspective view of my complete device, in which the end of the box is shown in dotted lines; Fig. 2, detail views of detached parts.

The reference-letter $a$ represents the end of a paper box, to which my invention is attached. An inside plate $b$, having a pair of forwardly-projecting perforated brackets $c$, is placed on the inside of the box, and a little pressure will force the brackets through the end thereof, the edges being rounded and stamped from the plate $b$, which can be made of tin or other thin sheet metal. After the brackets have been passed through the end of the box an outside plate $d$, having openings $e$, adapted to receive the brackets $c$, is placed against the outside of the box, the brackets passing through the openings $e$ and supporting the outside plate. Before the outside plate is placed in position a tag describing the contents, quality, and price is placed on the brackets, and when the outside plate is applied the tag is held securely in place. The outside plate can be made in any desired design. The one represented in the drawings has its corners cut away, and the corners of the sight-hole $f$ are cut fancy to make a better appearance. After the outside plate has been placed in position a handle $g$, made of spring metal and having lateral trunnions $h$, is secured to the brackets by means of the trunnions $h$, passing through the holes $k$ therein.

It will readily be seen that this pull is very easily applied and convenient, as one can be used time and time again. When a proprietor has finished with a box, he can easily remove the pull and place it on a new box. Then, again, as the handle is made of spring metal the pull will always remain in place, there being no chance for the trunnions to drop out of the holes in the brackets.

Having thus described my invention, what I claim as new, and desire to secure by Letters Patent, is—

In a drawer-pull, the combination, with an inside plate provided with integral perforated brackets stamped therefrom, of an outside plate having perforations for the reception of said brackets and a central opening, a tag or card denoting the contents of the box, secured by the brackets between the face of the box and the outside plate and in such position that it can be seen through the central opening, and a spring-handle provided with trunnions adapted to pass through said brackets to hold the plates in place, substantially as specified.

In testimony whereof I affix my signature in presence of two witnesses.

ROMAN EICHSTAEDT.

Witnesses:
CHAS. A. BLUHM,
HENRY H. BLUHM.